INVENTOR.
NORMAN B. TALSOE
BY
Herbert F. Somermeyer
ATTORNEY

INVENTOR.
NORMAN B. TALSOE
BY
Herbert F. Sonnemeyer
ATTORNEY

PULSE RISE TIME ($t_r$) AND FALL TIME ($t_f$)
-10 NS (NANO SECOND) MAXIMUM

PULSE FREQUENCY -10 MC (MEGACYCLES)

INVENTOR.
NORMAN B. TALSOE
BY
Herbert F. Somermeyer
ATTORNEY

United States Patent Office 3,284,636
Patented Nov. 8, 1966

3,284,636

PULSE TRANSFER CIRCUIT HAVING LIMITING MEANS, PEAKING MEANS, AND COMPLEMENTARY OUTPUTS

Norman B. Talsoe, St. Paul, Minn., assignor to Sperry Rand Corporation, New York, N.Y., a corporation of Delaware Filed Feb. 13, 1961, Ser. No. 88,874
11 Claims. (Cl. 307—88.5)

This invention relates to electrical pulse circuits that may be employed to drive a plurality of circuits and more particularly to such circuits as may be utilized as standard building block components in an electronic data processing system.

In the field of electronics, and more particularly in the field of digital computers, it is frequently required to operate a plurality of electronic circuits from a plurality of coincident pulses applied to an AND circuit or from one or more pulses applied to an OR circuit. In the past such requirement has been hindered by the unavailability of a reliably operating circuit with sufficient output power to split off and operate several succeeding circuits at a rate sufficient to meet the operating speeds of electronically operated computing devices in the 10 megacycle to 25 megacycle range. The present invention provides a circuit which operates as a standard computer building block utilizing transformer coupling logic wherein there are provided outputs that are normal to and complementary to the input. The term "normal" as used herein shall refer to the condition of a signal which is substantially similar to a reference signal in all degrees of form characteristics, magnitudes, and polarities, whereas the term "complementary" as used herein shall refer to the condition of a signal which is substantially similar to a reference signal in all degrees of form characteristics and magnitudes, but of opposite polarity. The output of a first circuit may be utilized as an input to a second circuit, all circuits being identical building blocks, with each circuit being capable of providing sufficient output power to drive a plurality of similar circuits, for example ten, paralleled to the first circuit output.

Accordingly, it is a primary object of the present invention to provide a new and improved pulse transfer circuit that may be used as a logical building block in digital computers.

Another object of this invention is to provide a new and improved AND/OR circuit with sufficient output power to drive several succeeding circuits, the term "AND/OR circuit" referring to a plurality of AND circuits each of which is coupled to a common terminal by an OR circuit.

Another object of this invention is to provide a pulse transfer circuit which has the capability of operating at a rate sufficient to meet the operating speeds of electronically operated computing devices at a 10 megacycle to 25 megacycle range.

These and other more detailed and specific objectives will be disclosed in the course of the following specification, reference being had to the accompanying drawings in which.

Figure 1:
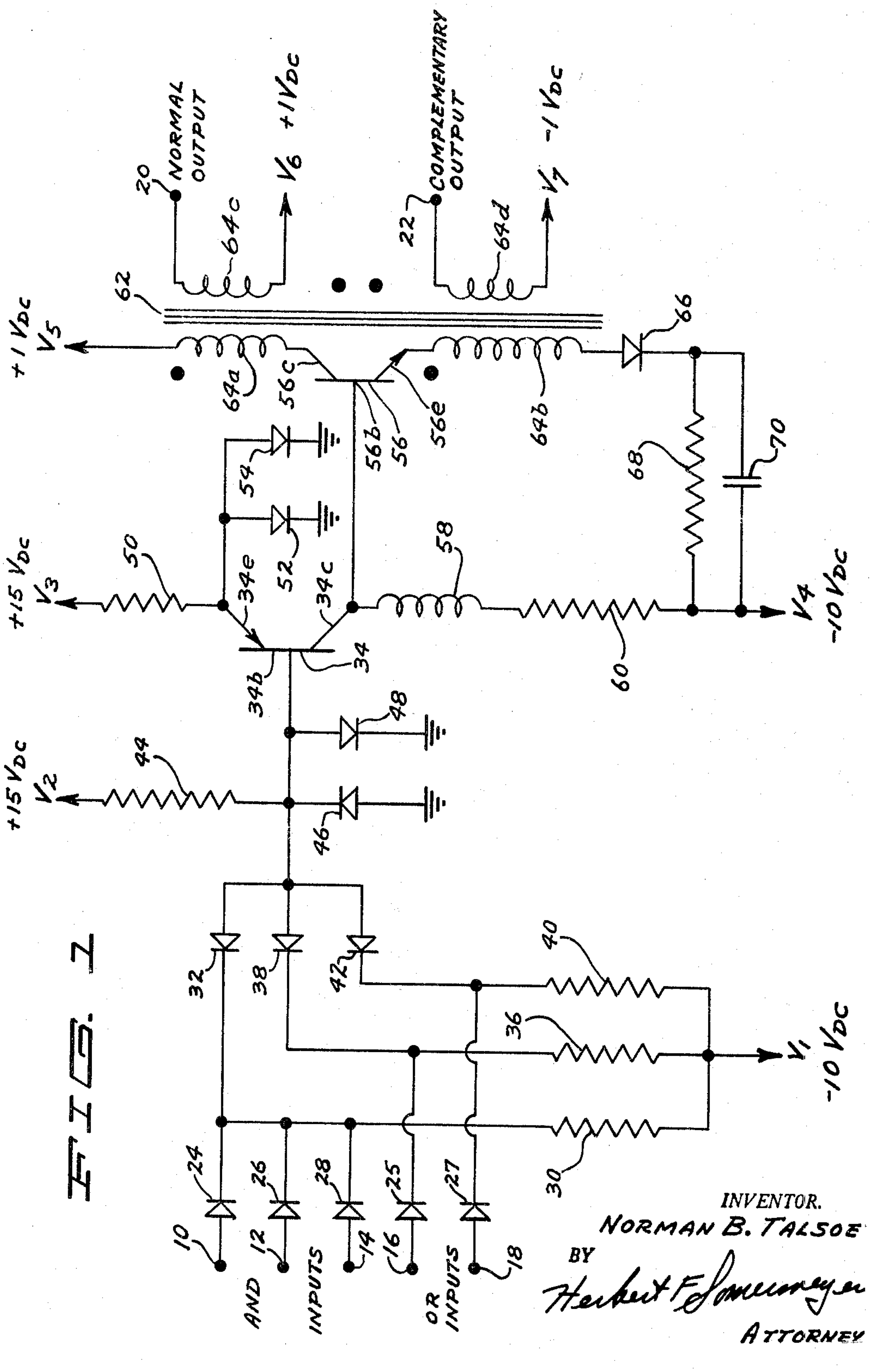
FIGURE 1 is a circuit diagram illustrating an exemplary embodiment of this invention.

The preferred embodiment of this invention is illustrated in FIGURE 1 wherein there are provided AND input terminals 10, 12, and 14, OR input terminals 16 and 18, normal output terminal 20, and complementary output terminal 22. Diodes 24, 26, and 28, couple input terminals 10, 12, and 14 respectively directly to a voltage source $V_1$ through resistor 30 and directly to diode 32, the other end of which is coupled directly to the base **34*b* of transistor 34. Diodes 25 and 27 couple input terminals 16 and 18 respectively, directly to voltage source $V_1$ through resistors 36 and 40 respectively, and to diodes 38 and 42 respectively, the other ends of which are coupled directly to the base 34*b* of transistor 34. The base 34*b* of transistor 34 is coupled directly to voltage source $V_2$ through resistor 44 and is clamped directly to a source of ground potential by clamping diodes 46 and 48. Diodes 46 and 48 are preferably of the silicon type and provide a maximum D.C. voltage swing limit at the base 34*b* of transistor 34. Diode 46 is poled so as to limit the maximum negative voltage swing and diode 48 is poled so as to limit the maximum positive voltage swing. The emitter 34*e* of transistor 34 is coupled directly to voltage source $V_3$ through resistor 50 and to a source of ground potential through the parallel combination of diodes 52 and 54. Diodes 52 and 54 are preferably of the germanium type and are poled so as to limit the maximum positive voltage swing at the emitter 34*e* of transistor 34. The collector 34*c* of transistor 34 is coupled directly to the base 56*b* of transistor 56 and directly to voltage source $V_4$ through serially associated inductor 58 and resistor 60. This D.C. coupling of transistor 34 to transistor 56 is in effect a cascaded transistor connection. The collector 56*c* of transistor 56 is coupled directly to voltage source $V_5$ through winding 64*a* of transformer 62. The emitter 56*e* of transistor 56 is coupled directly to voltage source $V_4$ through serially associated winding 64*b* of transformer 62, diode 66, and the parallel combination of resistor 68 and capacitor 70. The normal output terminal 20 is coupled directly to voltage source $V_6$ through windings 64*c* of transformer 62. The complementary output terminal 22 is coupled directly to voltage source $V_7$ through winding 64*d* of transformer 62**.

Figure 4:
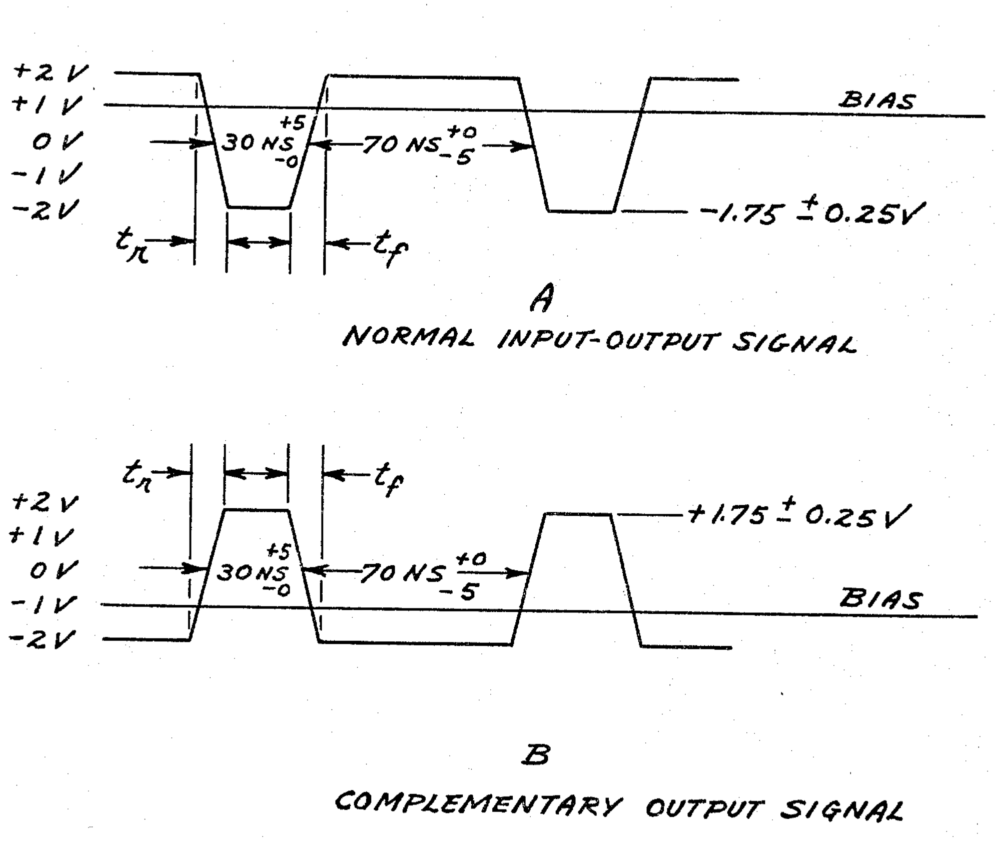
FIGURE 4 is a time-voltage relation plot of the input signal and the available output signals.

This configuration is designed to operate upon simultaneous applications to AND input terminals 10, 12, and 14 or upon individual applications to OR input terminals 16 or 18 of a signal conforming to the magnitude and form characteristics of the signal of FIGURE 4A. All input terminals which form an AND input circuit shall be considered as a "set" of input terminals; thus in FIGURE 1 input terminals 10, 12, and 14 are a set of input terminals. It is apparent to anyone of ordinary skill in the art that suitable reorientation of diodes, change in voltage sources, or change in component types or magnitudes would convert the illustrated embodiment of FIGURE 1 to a circuit capable of operating upon imposition of input signals of various polarities, magnitudes, and form characteristics. Thus the illustrated embodiment of FIGURE 1 is not intended to limit the scope of the invention, but is illustrative only.

The illustrated embodiment of FIGURE 1 when implemented with the normal input signal conforming to FIGURE 4A shall provide a signal conforming to FIGURE 4A at normal output terminal 20, and a signal conforming to FIGURE 4B at complementary output terminal 22.

In order to facilitate an understanding of the operation of this invention the following group of actual values for the elements of FIGURE 1 are presented. It should be understood that the principles of operation of this circuit may be present in circuits having a wide range of individual specifications so that the list of values here presented should not be construed as a limitation.

| | |
|---|---|
| Transistor **34** | 2N501. |
| Transistor **56** | 2N706. |
| Diodes **10, 12, 14, 32, 38, 42, 52, 54, 66.** | Clevite CGD-867. |
| Diodes **46** and **48** | Texas Instrument XD-8. |
| Transformer **62** | Core ¼" O.D. toroid, T1 material, windings 34 gauge solid enameled wire. |
| Resistor **44** | 10K±5%, ⅛ watt. |
| Resistor **50** | 910 ohm±5%, ⅛ watt. |
| Resistor **60** | 470 ohm±5%, ⅛ watt. |
| Resistor **68** | 50 ohms±5%, ⅛ watt. |
| Resistors **30, 36, 40** | 2.2K ohms±5%, ⅛ watt. |
| Capacitor **70** | 0.001 microfarad ± 20%, 50 volts. |
| $V_1$ | −10 v. D.C. |
| $V_2$ | +15 v. D.C. |
| $V_3$ | +15 v. D.C. |
| $V_4$ | −10 v. D.C. |
| $V_5$ | +1 v. D.C. |
| $V_6$ | +1 v. D.C. |
| $V_7$ | −1 v. D.C. |

Using the above values, operation of the circuit of FIGURE 1 shall be explained with reference to FIGURES 2 and 3 the elements of which have the same reference numbers as noted in FIGURE 1. As in a typical use, the circuit of FIGURE 1 shall be coupled to the normal output terminal of a circuit similar to that of FIGURE 1. The input source is shown as a winding 64$c^1$ and is intermediate a voltage source $V_6^1$ and a normal output terminal shown as terminal 20$^1$, which is coupled directly to input terminal 10. In the illustrated embodiment of FIGURE 1 the turns ratios of the windings of transformer 62 are $$\frac{N_{64a}}{3}:\frac{N_{64b}}{5}:\frac{N_{64c}}{3}:\frac{N_{64d}}{3}$$

where N represents the number of turns of windings 64*a*, 64*b*, 64*c*, and 64*d* of transformer 62.

Figure 2:
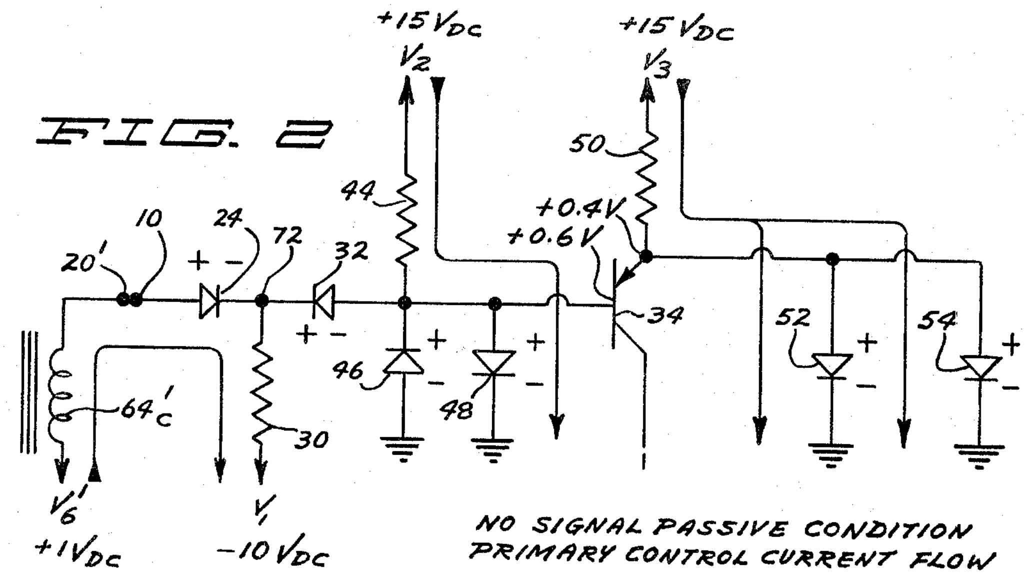
FIGURE 2 is a circuit diagram illustrating the primary control current flow in the circuit of FIGURE 1 without an enabling input signal.

Operation of the circuit of FIGURE 1 shall be explained with the aid of FIGURE 2 showing primary control current flow during the no signal input level. Voltage source $V_6^1$ forward biases diode 24 with respect to point 72 such that the voltage drop across diode 24 is at approximately +0.4 volt D.C. placing point 72 at approximately +0.6 volt D.C. This reverse biases diode 32 with respect to point 72 preventing current flow from voltage source $V_2$ through resistor 44, diode 32, and resistor 30 to voltage source $V_1$. Voltage source $V_2$ forward biases the positive clamping diode 48 with respect to ground such that current flow through resistor 44 and diode 48 to ground maintains the base 34*b* of transistor 34 at approximately +0.6 volt D.C. Voltage source $V_3$ biases diodes 52 and 54 with respect to ground such that current flow through resistor 50 and diodes 52 and 54 maintains the emitter 34*e* of transistor 34 at approximately +0.4 volt D.C. The potential difference between emitter 34*e* and base 34*b* of transistor 34 of +0.2 volt D.C. reverse biases transistor 34 and maintains transistor 34 in the nonconducting mode. As transistor 34 is reversed biased and nonconducting, its collector 34*c* is at a potential of −10.0 volts D.C. which maintains transistor 56 in the nonconducting mode.

Figure 3:
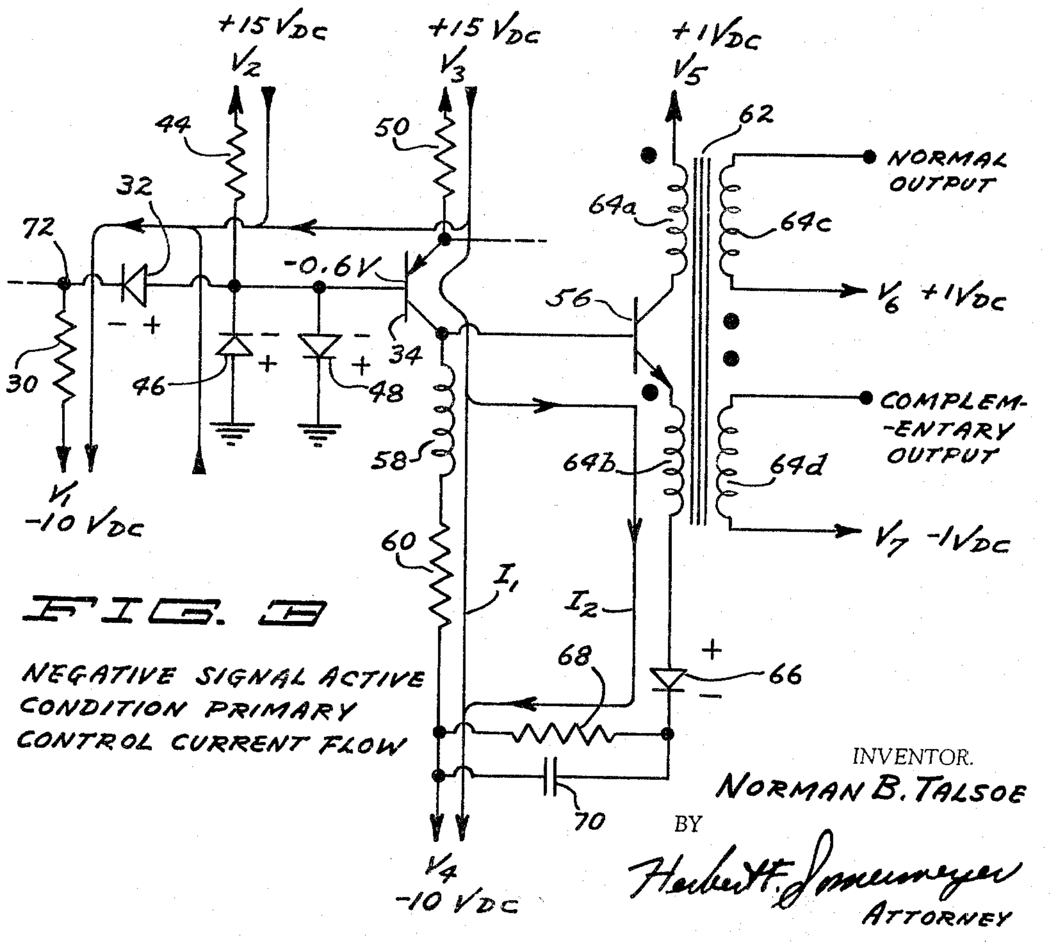
FIGURE 3 is a circuit diagram illustrating the primary control current flow in the circuit of FIGURE 1 with an enabling input signal.

Operation of the circuit of FIGURE 1 shall now be explained, with the aid of FIGURE 3, showing primary control current flow during the input signal level. Voltage source $V_6^1$ is overcome by the negative input pulse induced across winding 64$c^1$ which reverse biases diode 24 with respect to point 72 such that current flow through diode 24 is effectively halted. Diode 32 is then forward biased with respect to point 72 permitting current flow from voltage source $V_2$ through resistor 44, diode 32, and resistor 30 to voltage source $V_1$. This current flow drives the base 34*b* of transistor 34 negative from the positive clamping action of diode 48 until the negative clamping diode 46 clamps the potential at the base 34*b* of transistor 34 to approximately −0.6 volt D.C. This negative voltage swing of base 34*b* of transistor 34 of approximately +0.6 volt D.C. to approximately −0.6 volt D.C. switches transistor 34 into its conducting mode. This action transfers current flow from voltage source $V_3$, that initially flowed through positive clamping diodes 52 and 54 to ground, to the emitter-collector circuit of transistor 34. This current switch initiates a current pulse in the collector circuit of transistor 34 which flows through the parallel paths designated $I_1$ and $I_2$. As the effective reactance of inductor 58 and resistor 60 is much smaller than the input impedance of transistor 56 ($R_{IN_{56}}$), the base 56*b* of transistor 56 reacts as if driven from a voltage source as opposed to a current source, the signal amplitude being determined by $$(I_1+I_2)\frac{R_{60}R_{IN_{56}}}{R_{IN_{56}}+R_{60}}$$

Upon initiation of the current pulse in the collector circuit of transistor 34 inductor 58 acts as a high impedance during current rise time, thereby accelerating the base voltage reaction of transistor 56. Upon reaching the current steady state condition, inductor 58 ceases to act as a high impedance and the serial combination of inductor 58 and resistor 60 acts as a low impedance path of $I_1$ to voltage source $V_4$ as compared to the path taken by $I_2$. The current paths identified by $I_1$ and $I_2$ provide shunt peaking for transistor 34 aiding the switching action of transistor 56. With path $I_1$, as the transistor 34 collector circuit appears as the effective load the pulse across this load, is amplified by transistor 56 at approximately the ratio $$1+\frac{N_c}{N_e}$$

where $N_c$ is the number of turns in windings 64*a* of transformer 62 and $N_e$ is the number of turns in winding 64*b* of transformer 62. By reflecting the output load partially in the collector circuit and partially in the emitter circuit of transistor 56, the rise time capabilities are enhanced as the portion reflected in the emitter acts as emitter degeneration. The voltage pulse across windings 64*a* and 64*b* of transformer 62 due to transistor 56 is stepped down at the ratio $$\frac{N_{64c}}{N_{64a}+N_{64b}}$$

where N represents the number of turns of windings 64*a*, 64*b*, and 64*c* of transformer 62 which, with the values noted, gives a voltage reduction of 8:3. This results in an output pulse at normal output terminal 20 of −3.5 volts D.C. to −3.8 volts D.C. The RC network in the path $I_2$ formed by the parallel combination of resistor 68 and capacitor 70 provides, after three or four pulses, a bias voltage which assures cutoff of transistor 56 on the negative swing of base 56*b* of transistor 56. Diode 66 aids in the cutoff characteristic of transistor 56 and also prevents emitter current leakage during the nonconducting mode of transistor 56.

It is understood that suitable modifications may be made in the structure as disclosed provided such modifications came within the spirit and scope of the appended claims. Having now, therefore, fully illustrated and described our invention, what we claim to be new and desire to protect by Letters Patent is set forth in the appended claims.

What is claimed is:

1. A pulse transfer circuit comprising: input means; at least two cascaded semiconductor means each of which includes at least three electrodes; transformer means which includes a plurality of winding means; means coupling said input means directly to a first electrode of a first of said semiconductor means; means limiting the voltage swing of said first electrode of said first semiconductor means; means limiting the voltage swing of a second electrode of said first semiconductor means; means coupling a third electrode of said first semiconductor means directly to a first electrode of a second of said semiconductor means; an inductive impedance means coupling said third electrode of said first semiconductor means to a first voltage source; means coupling a second electrode of said second semiconductor means through a first winding means to a second voltage source; a third electrode of said second semiconductor means coupled to a third voltage source through the serial combination of a second winding means of said transformer means and a unidirectional impedance means; said first and second winding means coupling the output signal of said second semiconductor means to a third winding means of said transformer means such that said third winding means provides an output signal substantially similar to an input signal impressed upon said input means.

2. A pulse transfer circuit comprising: input means; at least two cascaded semiconductor means each of which includes at least three electrodes; transformer means which includes a plurality of winding means; means coupling said input means directly to a first electrode of a first of said semiconductor means; first and second unidirectional impedance means connected in parallel and poled oppositely to clamp said first electrode of said first semiconductor means to a first voltage source; a third unidirectional impedance means clamping a second electrode of said first semiconductor means to a second voltage source; means coupling a third electrode of said first semiconductor means directly to a first electrode of a second of said semiconductor means; an inductive impedance means coupling a third electrode of said first semiconductor means to a third voltage source, said inductive impedance means acting as a high impedance during current rise time thereby accelerating the reaction of said second semiconductor means to a signal impressed upon said first electrode of said second semiconductor means; means coupling a second electrode of said second semiconductor means to a fourth voltage source through a first winding of said transformer means; a third electrode of said second semiconductor means coupled to a fifth voltage source through the serial combination of a second winding means of said transformer means and a fourth unidirectional impedance means; said first and second winding means coupling the output signal of said second semiconductor means to a third winding means of said transformer means such that said third winding means provides an output signal substantially similar to an input signal impressed upon said input means.

3. A pulse transfer circuit comprising: input means; at least two cascaded semiconductor means each of which includes at least three electrodes; transformer means which includes a plurality of winding means; means coupling said input means directly to a first electrode of a first of said semiconductor means; first and second unidirectional impedance means connected in parallel and poled oppositely to clamp said first electrode of said first semiconductor means to a first voltage source; a third unidirectional impedance means clamping a second electrode of said first semiconductor means to a second voltage source; means coupling a third electrode of said first semiconductor means directly to a first electrode of a second of said semiconductor means; an inductive impedance means coupling a third electrode of said first semiconductor means to a third voltage source, said inductive impedance means acting as a high impedance during current rise time thereby accelerating the reaction of said second semiconductor means to a signal impressed upon said first electrode of said second semiconductor means; means coupling a second electrode of said second semiconductor means to a fourth voltage source through a first winding of said transformer means; a third electrode of said second semiconductor means coupled to a fifth voltage source through the serial combination of a second winding means of said transformer means and a fourth unidirectional impedance means; said first and second winding means coupling the output signal of said second semiconductor means to third and fourth winding means of said transformer means such that said third winding means provides an output signal substantially similar to an input signal impressed upon said input means and said fourth winding means provides an output signal substantially similar to the input signal impressed upon said input means but of opposite polarity.

4. A pulse transfer circuit comprising: an input circuit; an amplifying circuit; and an output; said amplifying circuit including at least two cascaded semiconductor means each of which includes at least three electrodes; said output circuit including at least one transformer means which includes a plurality of winding means; means coupling said input circuit directly to a first electrode of a first semiconductor means; first and second unidirectional impedance means clamping said first electrode of said first semiconductor means to a source of ground potential; said first and second unidirectional impedance means arranged in parallel association and oppositely poled, said arrangement of said first and second unidirectional impedance means limiting the voltage swing of said first electrode of said first semiconductor impedance means to the voltage drop across said first and second unidirectional impedance means; a third unidirectional impedance means clamping a second electrode of said first semiconductor means to a source of ground potential; an inductive impedance means coupling a third electrode of said first semiconductor means to a first voltage source; means coupling said third electrode of said first semiconductor means directly to a first electrode of a second semiconductor means; said inductive impedance means acting as a high impedance during current rise time accelerating the reaction of said second semiconductor means to a signal impressed upon said first electrode of said second semiconductor means; a second electrode of said second semiconductor means coupled directly to a first winding of said transformer means, a third electrode of said second semiconductor means coupled directly to a second winding means of said transformer means said first and second winding means coupling the output signal of said second semiconductor means to third and fourth winding means of said transformer means, said third winding means providing an output signal substantially similar to an input signal impressed upon said input circuit, said fourth winding means providing an output signal substantially similar to an input signal impressed upon said input circuit but of opposite polarity.

5. A pulse transfer circuit comprising: an input circuit; an amplifying circuit; and an output circuit; said input circuit including an AND/OR circuit means; said amplifying circuit including at least two cascaded semiconductor means each of which includes at least three electrodes; said output circuit including at least one transformer means which includes a plurality of winding means; means coupling said AND/OR circuit means directly to a first electrode of a first semiconductor means; first and second unidirectional impedance means clamping said first electrode of said first semiconductor means to a first voltage source, said first and second unidirectional impedance means arranged in parallel association and oppositely poled, said arrangement of said first and second unidirectional impedance means limiting the voltage swing of said first electrode of said first semiconductor impedance means to the voltage drop across said first and second unidirectional impedance means; a third unidirectional impedance means clamping a second electrode of said first semiconductor means to a second voltage source; an inductive impedance means coupling a third electrode of said first semiconductive means to a third voltage source; means coupling said third electrode of said first semicondutcor means directly to a first electrode of a second semiconductor means; said inductive impedance means acting as a high impedance during current rise time accelerating the reaction of said second semiconductor means to a signal impressed upon said first electrode of said second semicondutcor means; a second electrode of said second semicondutcor means coupled directly to a fourth voltage source through a first winding of said transformer means, a third electrode of said second semiconductor means coupled to a fifth voltage source through the serial combination of a fourth unidirectional impedance means and a second winding means of said transformer means, said first and second winding means coupling the output signal of said second semiconductor means to third and fourth winding means of said transformer means, said third winding means providing an output signal substantially similar to an input signal impressed upon said input circuit, said fourth winding means providing an output signal substantially similar to an input signal impressed upon said input circuit but of opposite polarity.

6. A pulse transfer circuit comprising: an input circuit; an amplifying circuit; and an output circuit; said amplifying circuit including at least two cascaded semiconductor means each of which includes at least three electrodes; said output circuit including at least one transformer means which includes at least four winding means; means coupling said input circuit to a first electrode of a first semiconductor means; first and second unidirectional impedance means clamping said first electrode of said first semiconductor means to a source of ground potential, said first and second unidirectional impedance means arranged in parallel association and oppositely poled; said arrangement of said first and second unidirectional impedance means limiting the voltage swing of said first electrode of said first semiconductor impedance means to the voltage drop across said first and second unidirectional impedance means; a third unidirectional impedance means clamping a second electrode of said first semiconductor means to a source of ground potential; an inductive impedance means coupling a third electrode of said first semiconductor means to a first voltage source, means coupling said third electrode of said first semiconductor means directly to a first electrode of a second semiconductor means; said inductive impedance means acting as a high impedance during current rise time accelerating the reaction of said second semiconductor means to a signal impressed upon said first electrode of said second semiconductor means, a second electrode of said second semiconductor means coupled to a second voltage source through a first winding of said transformer means, a third electrode of said second semiconductor means coupled to a third voltage source through the serial combination of a fourth unidirectional impedance means and a second winding means of said transformer means, said first and second winding means coupling the output signal of said second semiconductor means to third and fourth winding means of said transformer means, said third winding means intermediate a fourth voltage source and a first output terminal, said first output terminal providing an output signal substantially similar to an input signal impressed upon said input circuit, said fourth winding means intermediate a fifth voltage source and a second output terminal, said second output terminal providing an output signal substantially similar to an input signal impressed upon said input circuit but of opposite polarity, said output signals being of sufficient power to drive at least ten similar pulse transfer circuits when coupled in parallel to said third or fourth winding means.

7. A pulse transfer circuit comprising a plurality of input terminals said input terminals including at least one set of input terminals, a unidirectional impedance means coupling each input terminal of said set directly to a common resistive means and a common unidirectional impedance means; said common resistive means coupling said set to a first voltage source, and said unidirectional impedance means coupling said set to a first electrode of a first active element having at least three electrode; said first electrode of said first active element coupled through a first resistive means to a second voltage source, and through a parallel combination of first and second unidirectional impedance means to a source of ground potential; a second electrode of said first active element coupled through a second resistive means to a third voltage source, and through a parallel combination of third and fourth unidirectional impedance means to a source of ground potential; a third electrode of said first active element coupled through a serial combination of a first inductive means and a third resistive means to a fourth voltage source, and to a first electrode of a second active element having at least three electrodes; a second electrode of said second active element coupled through a first winding of a first transformer means having at least three windings directly to a fifth voltage source; a third electrode of said second active element coupled through a serial combination of a second winding of said first transformer means, a fifth unidirectional impedance means, and a parallel combination of a fourth resistive means and a first capacitive means directly to a sixth voltage source; and a third winding of said first transformer means coupling a first output terminal to a seventh voltage source.

8. The apparatus of claim 7 further comprising a fourth winding of said first transformer means coupling a second output terminal to an eighth voltage source said second output terminal providing an output signal complementary to the output signal furnished by said first output terminal.

9. The apparatus of claim 7 wherein the ratios of said first, second, and third windings of said first transformer means are 3:5:3.

10. The apparatus of claim 7 wherein said first unidirectional impedance means is a silicon diode oriented so as to present a high impedance to ground to a signal of positive polarity, said second unidirectional impedance is a silicon diode oriented so as to present a low impedance to ground to a signal of positive polarity, and said third and fourth unidirectional impedance means are germanium diodes oriented so as to present a low impedance to ground to a signal of positive polarity.

11. The apparatus of claim 7 further being characterized by a power amplification factor of the applied signal power, said power amplification factor being at least ten, and the amplified power signal being available at said output terminal.

References Cited by the Examiner

UNITED STATES PATENTS

| | | | |
|---|---|---|---|
| 2,853,630 | 9/1958 | Lane | 307—88.5 |
| 2,892,952 | 6/1959 | McVey | 307—88.5 |
| 2,946,899 | 7/1960 | Day. | |
| 2,999,169 | 9/1961 | Feiner | 307—88.5 |
| 2,999,947 | 9/1961 | Dean. | |
| 3,003,069 | 10/1961 | Clapper | 307—88.5 |
| 3,031,588 | 4/1962 | Hilsenrath | 307—88.5 |

FOREIGN PATENTS

| | | |
|---|---|---|
| 837,415 | 11/1956 | Great Britain. |

OTHER REFERENCES

Pulse and Digital Ckt., by Millman and Tub, McGraw-Hill, New York, 1957, pp. 404–406.

Selected Semiconductor Ckts. Handbook by Schwartz (Wiley and Sons), New York, 1960, pp. 4–45.

Transistorized Circuit for Digital Computers by Pressman, John F. Rider, Inc., New York, pp. 10–256 and 257.

ARTHUR GAUSS, *Primary Examiner.*

HERMAN K. SAALBACH, GEORGE N. WESTBY, *Examiners.*

B. P. DAVIS, *Assistant Examiner.*